United States Patent [19]
Yamaguchi

[11] Patent Number: 5,880,366
[45] Date of Patent: *Mar. 9, 1999

[54] FLOW SENSOR APPARATUS INSTALLED IN A FLUID PATH

[75] Inventor: Takayuki Yamaguchi, Sendai, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 632,139

[22] Filed: Apr. 15, 1996

[30] Foreign Application Priority Data

Apr. 13, 1995 [JP] Japan ................................. 7-112294

[51] Int. Cl.⁶ .................................................... G01F 1/68
[52] U.S. Cl. ........................................................ 73/204.26
[58] Field of Search .............. 73/204.26, 204.21–204.25

[56] References Cited

U.S. PATENT DOCUMENTS

| | | | |
|---|---|---|---|
| 4,624,138 | 11/1986 | Ona et al. ............................. | 73/204.26 |
| 4,688,424 | 8/1987 | Handtmann et al. ................. | 73/204.26 |
| 5,392,647 | 2/1995 | Manaka ................................ | 73/204.26 |
| 5,423,212 | 6/1995 | Manaka ................................ | 73/20.26 |
| 5,553,497 | 9/1996 | Doi et al. ............................. | 73/204.26 |

*Primary Examiner*—Richard Chilcot
*Assistant Examiner*—Jewel V. Thompson
*Attorney, Agent, or Firm*—Oblon, Spivak, McClelland, Maier & Neustadt, P.C.

[57] ABSTRACT

A novel flow sensor which includes a wall in a fluid path, a substrate installed on the wall, a flow sensor constructed with at least one electric resistor formed on the substrate, and a construction for reducing turbulence caused by an existence of the flow sensor. The construction for reducing turbulence may be that an upstream side edge of the substrate is formed into a slope shape, a stair shape or a streamline. The construction for reducing turbulence may also be that the substrate is embedded into the wall. In a case that the substrate of the sensor is installed on a support board set in the fluid path, at least an upstream side edge of the support board may be formed into an acute angle or a streamline. Using the apparatus, the turbulence caused by the existence of a vertical wall is reduced because a size of vertical wall portions is small.

6 Claims, 5 Drawing Sheets

FLOW SENSOR APPARATUS INSTALLED IN A FLUID PATH

BACKGROUND OF THE INVENTION

1. Field of the Invention

The present invention relates to a flow sensor installed in a fluid path for measuring a physical property of a fluid, i.e., a gas or liquid, flowing through the fluid path, and in particular, the present invention may be applied to a thermal-type flow sensor formed on a substrate which is applicable to the control and measurement of a flowing velocity or flow volume of a gas flow or liquid flow.

2. Discussion of the Background

Various types of sensors for measuring various physical properties, e.g., a flowing velocity or a flow volume, of a gas flow or a liquid flow are known, including one in which a thermal-type flow sensor is formed on a substrate.

FIG. 1 shows an example of a background thermal-type gas flow sensor formed on a substrate as disclosed in Japanese Laid-Open Patent Application (KOKAI) 5-157603.

As shown in FIG. 1, a bridge-like thin film sensor 5 is suspended over a hollow 3 of a square semiconductor substrate 1. An upstream-side temperature sensing portion 9 and a downstream-side temperature sensing portion 11 each constructed with an electric resistor are formed on the bridge-like thin film sensor 5. A heater constructed with an electric resistor is formed between these sensing portions 9, 11 on the bridge-like thin film sensor 5. In a case that a gas does not flow in the flow direction A, the upstream-side sensing portion 9 is heated the same as the downstream-side sensing portion 11 by the heater 7. However, in a case that a gas flows in the direction A, the upstream-side sensing portion 9 is heated more than the downstream-side sensing portion 11 by the warm gas heated by the heater 7. As resistance values of these sensing portions 9, 11 vary due to the temperature variation, a flowing velocity or flowing volume of the gas can be measured by the resistance value difference between these sensing portions 9, 11.

FIG. 2 is sectional side view showing a tube 15 as a fluid path and the substrate 1 of the thermal-type gas flow sensor installed in the tube 15.

The substrate 1 of the flow sensor is installed on an inner wall 17 of the tube 15. A wire 13 outputs measurement signals from sensing portions 9, 11.

According to an experiment of the sensor as shown in FIG. 2 using a circuit as shown in FIG. 3 conducted by the applicants of the present invention, a relation of power of an output signal V from the sensing circuit and a flow rate Q is shown as in FIG. 4. As shown in FIG. 4, the power of output signal V becomes unstable on a fast flow. This unstableness is understood to be caused by a turbulence of the flow. As can be seen from the above description, it is very important to reduce a turbulence of the flow.

SUMMARY OF THE INVENTION

In view of the foregoing drawbacks in the background flow sensor, one object of the present invention to provide a novel flow sensor which measures physical properties of various fluids stably.

In achieving this object, the applicants have determined that turbulence is caused by an existence of a vertical-wall edge section at a side of the substrate of the sensor.

In accordance with the present invention, the object of the present invention is attained by a novel flow sensor which includes a wall in the fluid path, a substrate installed on the wall, a flow sensor constructed with at least one electric resistor formed on the substrate, and a means for reducing turbulence caused by the existence of this flow sensor. The means for reducing turbulence may be a construction that an upstream side edge of the substrate is formed into a slope shape, a stair shape or a streamline. The means for reducing turbulence may further be a construction that the substrate is embedded into the wall. In a case that the substrate of the sensor is installed on a support board set in the fluid path, at least an upstream side edge of the board may be formed into an acute angle or a streamline.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 12 shows a still further embodiment of the present invention in which the substrate is embedded into a support board set in the fluid path;

FIG. 13 shows a still further embodiment of the present invention in which a streamline portion is set in front of a vertical wall on an upstream side of the substrate installed on a wall forming at least a part of the fluid path;

FIG. 14 shows a still further embodiment of the present invention in which a streamline portion is set in front of a vertical wall on an upstream side of a support board and in which the substrate is installed on the support board set in the fluid path;

FIG. 15 shows a still further embodiment of the present invention in which a streamline portion is set in front of a vertical wall on upstream and downstream sides of a support board set in the fluid path and in which the substrate is embedded into the support board; and FIG. 16 shows a relation of power of an output signal from the sensing circuit and a flow rate in an embodiment of the present invention.

DETAILED DESCRIPTION OF THE PREFERRED EMBODIMENTS

Figure 5A:
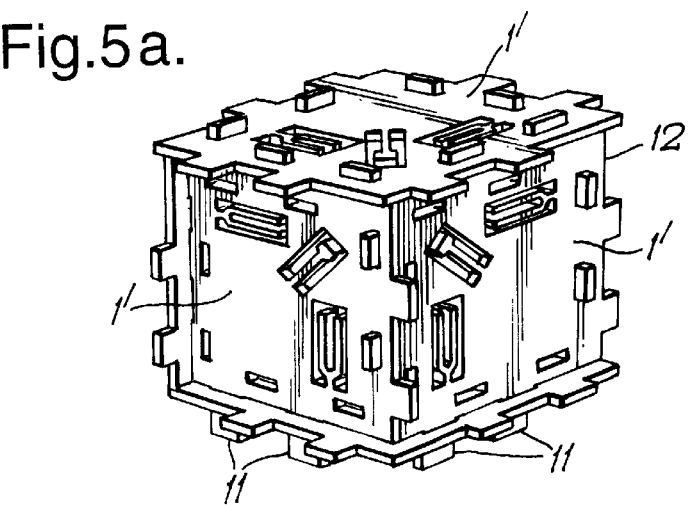
FIG. 5 shows an embodiment of the present invention in which an upstream and a downstream side edge of the substrate are formed into a slope shape.
Figure 5B:
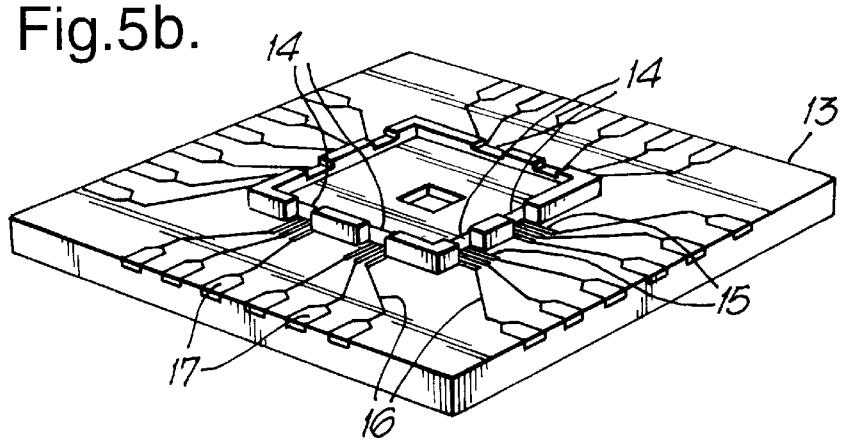
Figure 5C:
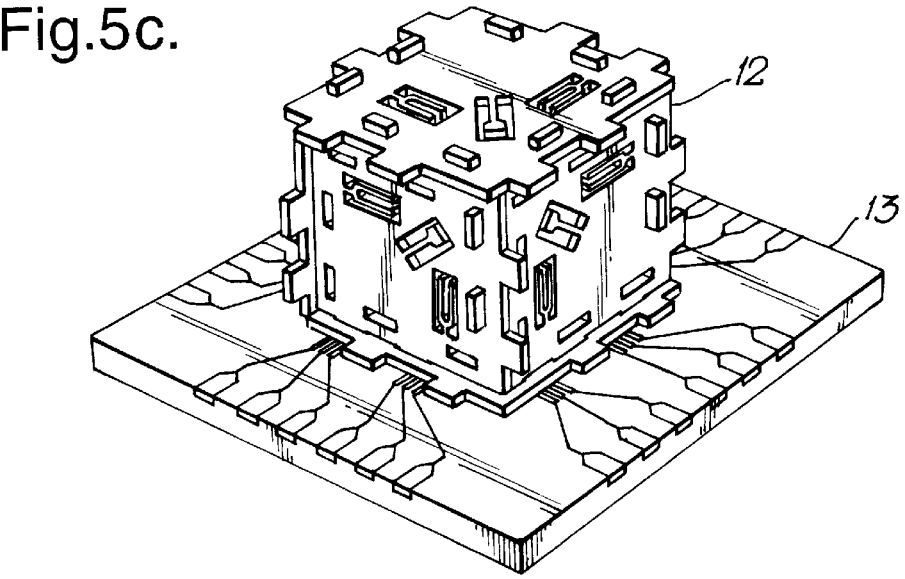

Referring now to the drawings, wherein like reference numerals designate identical or corresponding parts throughout the several views, and more particularly to FIG. 5 thereof, one embodiment of the present invention is now described in further detail.

Referring to FIG. 5, there is shown a fluid path 15, a wall 17 forming part of the fluid path 15, a substrate 1 installed on the wall 17, sensing portions 9, 11 and a heater 7 forming a thin film sensor, and a wire 13 which outputs a measurement signal from these sensing portions 9, 11. An arrow A shows a direction of fluid flow.

In this embodiment, an upstream side edge 19 and a downstream side edge 19 of the substrate 1 are formed into a slope shape.

Using the apparatus as illustrated in FIG. 5, the turbulence caused by an existence of a vertical wall is reduced because no vertical wall exists at the upstream and downstream sides of the substrate 1, i.e., the walls have slope shaped edges 19.

To obtain this slope shape of the side edge of the substrate 1, the substrate 1 may be cut off from a wafer using a dicing saw which has a sectional shape of its blade formed into a trapezoid or triangle.

Figure 6:
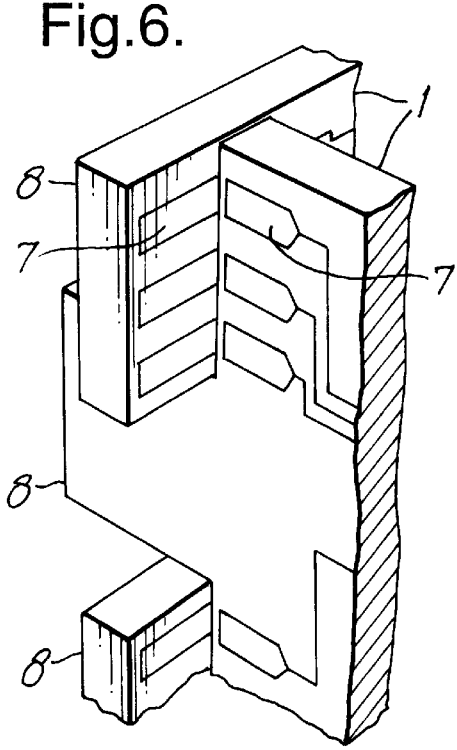
FIG. 6 shows a diebonding resin forming the slope shape on the upstream side and the downstream side of the substrate.

As shown in FIG. 6, the slope shape can also be created by utilizing a diebonding resin 21 gluing the substrate 1 to the wall 17 which is protruded from between the substrate 1 and the wall 17, and which forms a slope shape on the upstream side and the downstream side of the substrate 1.

In this case of the embodiment of FIG. 6, the slope shape has a gentle concave slope.

Figure 7:
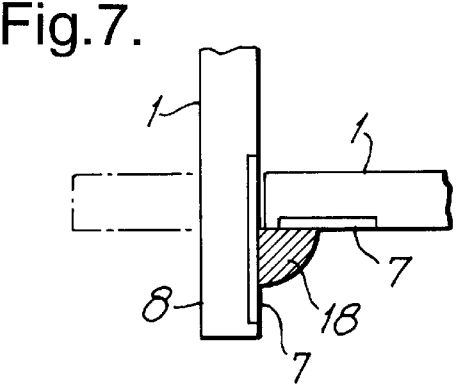
FIG. 7 shows another embodiment of the present invention in which a downstream side edge of the substrate is formed into a stair shape having several steps.

FIG. 7 shows another embodiment of the present invention. In this embodiment of FIG. 7, an upstream side edge 23 and a downstream side edge 23 of the substrate 1 are formed into a stair shape having several steps.

Using the embodiment as illustrated in FIG. 7, the turbulence caused by an existence of a vertical wall is reduced because a size of the vertical wall sections is small.

Figure 8:
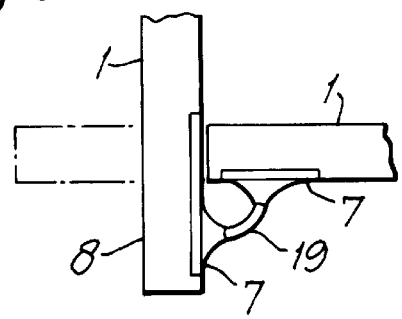
FIG. 8 shows yet another embodiment of present invention in which the substrate is installed on a support board set in the fluid path, an upstream side edge of the board is formed into an acute angle, and a diebonding resin forms a slope shape on the upstream side of the substrate.
Figure 11A:
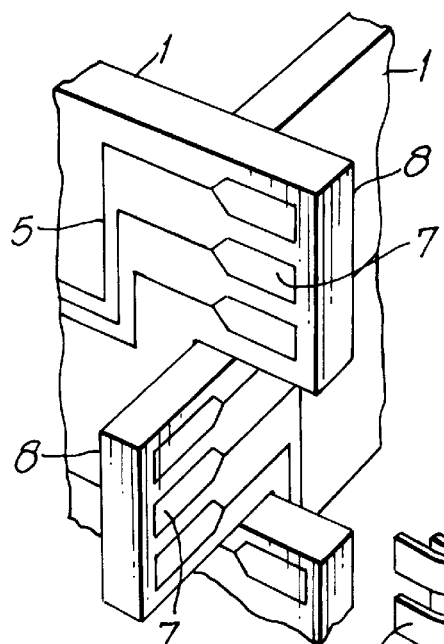
FIG. 11 shows a modification of the embodiment as shown in FIG. 8 in which both side edges of a support board are formed into an acute angle.
Figure 11C:
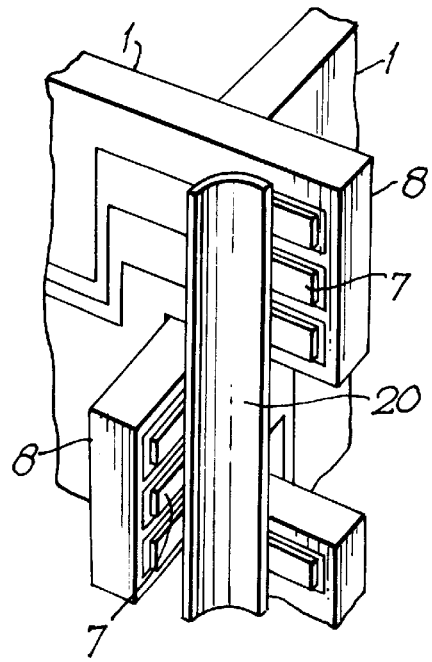
Figure 11B:
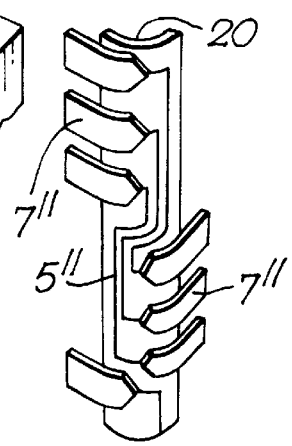

As shown FIG. 8, the substrate 1 may be installed on a support board 25 set in the fluid path 15. The board 25 is supported by a lateral side of the wall. An upstream side edge 27 of the board 25 may be formed into an acute angle. In this embodiment, a diebonding resin may further form a slope shape 21 on the upstream side of the substrate 1. Instead of these resin slope shapes, an upstream side edge of the substrate 1 may be formed into a slope shape or stair shape as shown in respective FIGS. 5 and 7. These slope and stair shapes may also be formed on the downstream side of the substrate 1. A downstream side edge of the board 25 may also be formed into an acute angle. That is, both side edges of the board 25 may be formed into an acute angle as shown in FIG. 11.

Figure 9A:
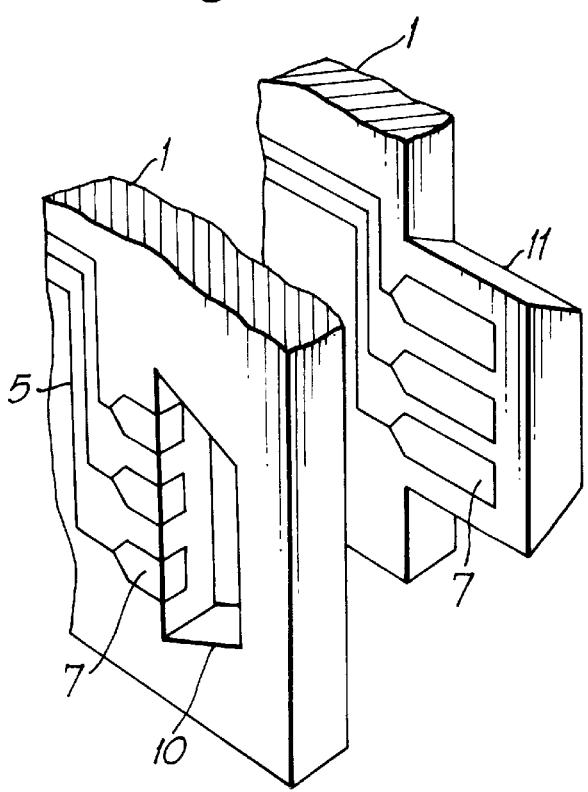
FIG. 9 shows a further embodiment of the present invention in which the substrate is embedded into the wall forming at least a part of the fluid path.
Figure 9B:
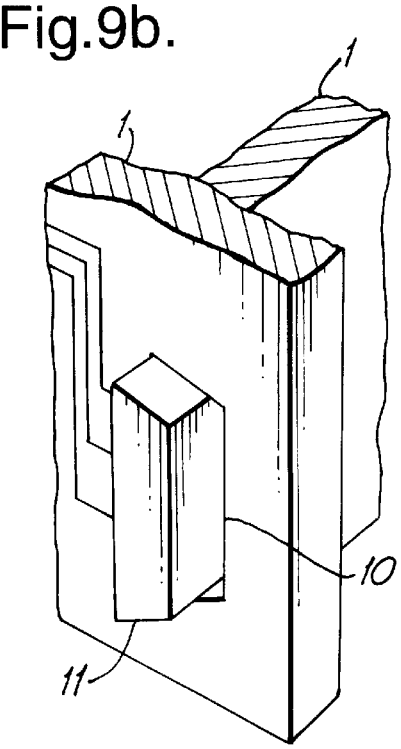

FIG. 9 shows yet another embodiment of the present invention. In this embodiment of FIG. 9, the substrate 1 is embedded into the wall 17 forming the fluid path 15.

Using the apparatus as illustrated in FIG. 9, the turbulence caused by an existence of a vertical wall is reduced because no vertical wall section is present at upstream and downstream sides of the substrate 1.

Figure 10A:
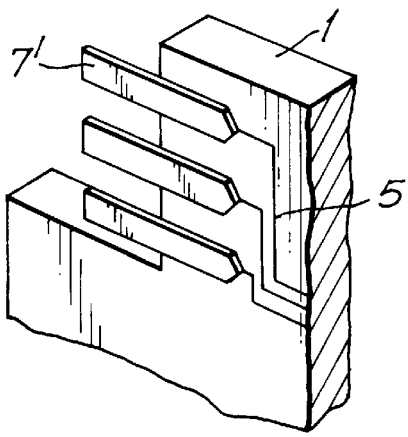
FIG. 10 shows a modification of the embodiment as shown in FIG. 9 in which a connector outputting measurement signals from sensing portions is formed in a plate-shape.
Figure 10B:
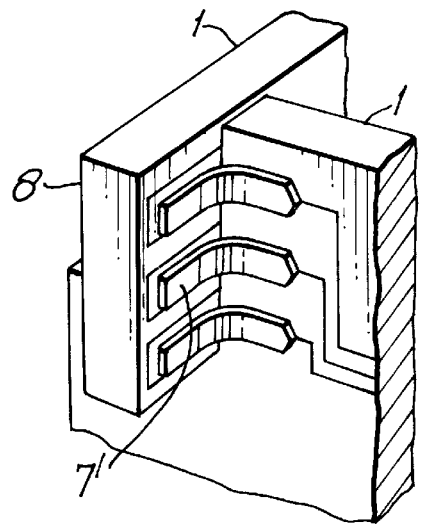

Referring to FIG. 10, there is shown a modification of the embodiment as shown FIG. 9. The apparatus shown in FIG. 10 is similar to that described above in FIG. 9 with the exception that this further embodiment includes a plate-shaped connector 29 instead of the wire 13 of FIG. 9 for outputting measurement signals from sensing portions 9, 11.

Using the apparatus as illustrated in FIG. 10, even the turbulence caused by an existence of the wire 13 is reduced because no wire 13 is present.

FIGS. 11 and 12 show further embodiment of the present invention. In the embodiments of FIGS. 11 and 12, the substrate 1 including sensing portions 9, 11 and heater 7 is embedded into a support board 25 set in the fluid path 15. Further, in the embodiment of FIG. 12, both side edges 27 of the board 25 are formed into an acute angle as shown FIG. 12. As shown in FIG. 12, a connector 29 outputting measurement signals from sensing portions 9, 11 may be formed in a plate-shape.

Using the apparatus as illustrated in FIG. 12, the turbulence caused by an existence of a vertical wall is reduced because no vertical wall is present at the upstream and downstream sides of the substrate 1.

FIG. 13 shows an example of a further embodiment of the present invention. In this further embodiment, in order to reduce turbulence caused by an existence of a vertical wall, a streamline portion 33 is set in front of the vertical wall. In this embodiment of FIG. 13, a streamline portion 33 is set in front of a vertical wall on an upstream side of substrate 1 installed on a wall 17 forming a part of the fluid path 15.

FIG. 14 shows another example of an embodiment of the present invention. In this embodiment a streamline portion 35 is set in front of a vertical wall on an upstream side of a support board 25, and the substrate 1 is installed on the support board 25 set in the fluid path 15.

FIG. 15 shows yet another example of an embodiment of the present invention. In this embodiment, streamline portions 37 and 37a are set in front of a vertical wall on upstream and downstream sides of a support board set in the fluid path 15, and the substrate 1 is embedded into the support board. Similarly as shown in FIG. 12, the connector 29 outputting measurement signals from sensing portions 9, 11 may be formed in a plate-shape.

Figure 1:
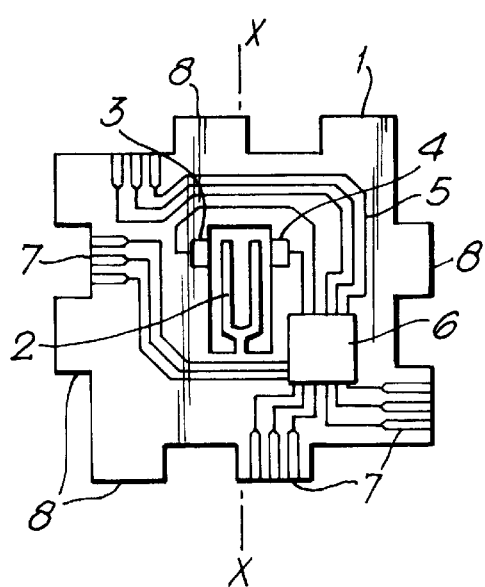
FIG. 1 is a bird's-eye view showing a background thermal-type gas flow sensor formed on a substrate.
Figure 2:
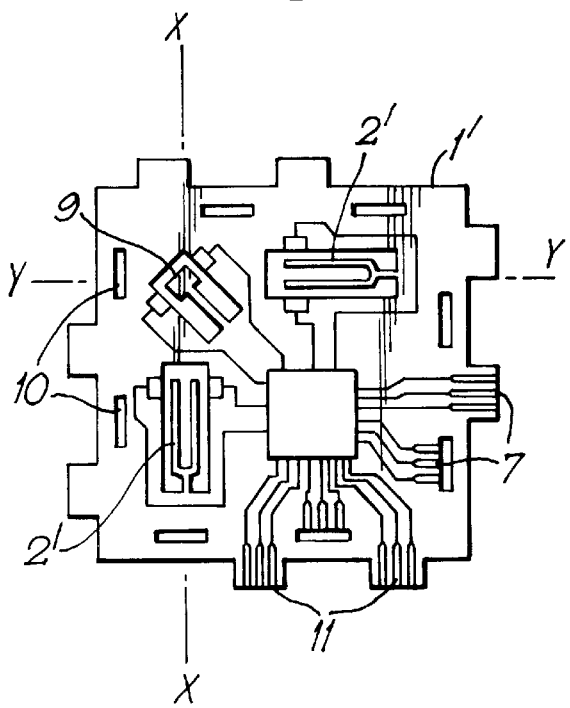
FIG. 2 is a sectional side view showing a tube as a fluid path and the substrate of the background thermal-type gas flow sensor installed in the tube.
Figure 3:
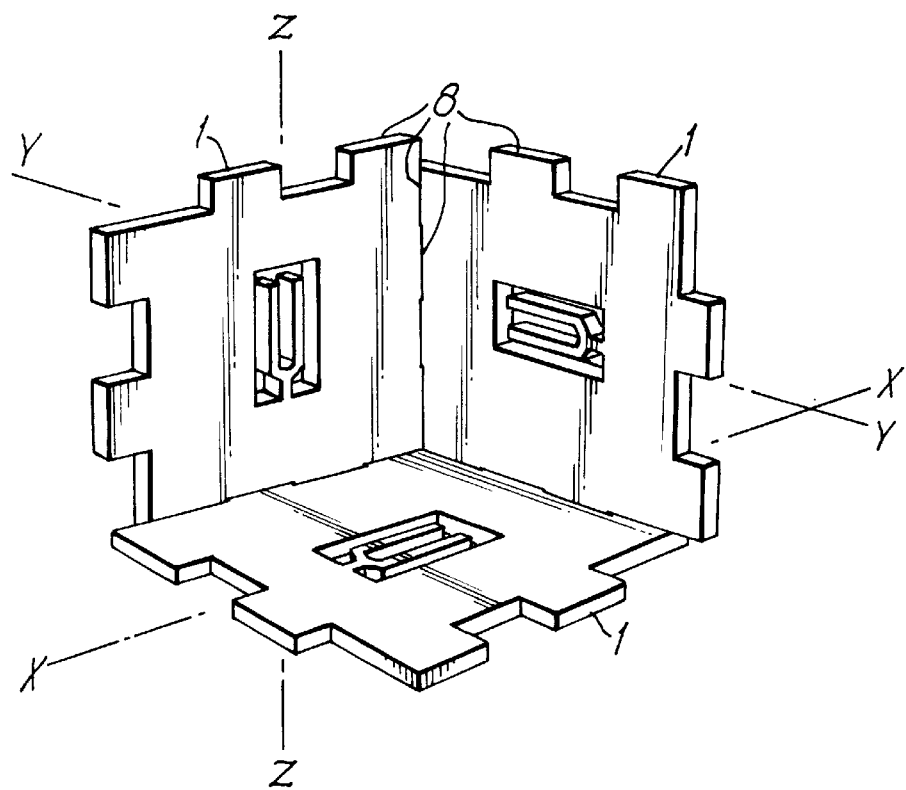
FIG. 3 is a circuit diagram of a background thermal-type gas flow sensor.
Figure 4:
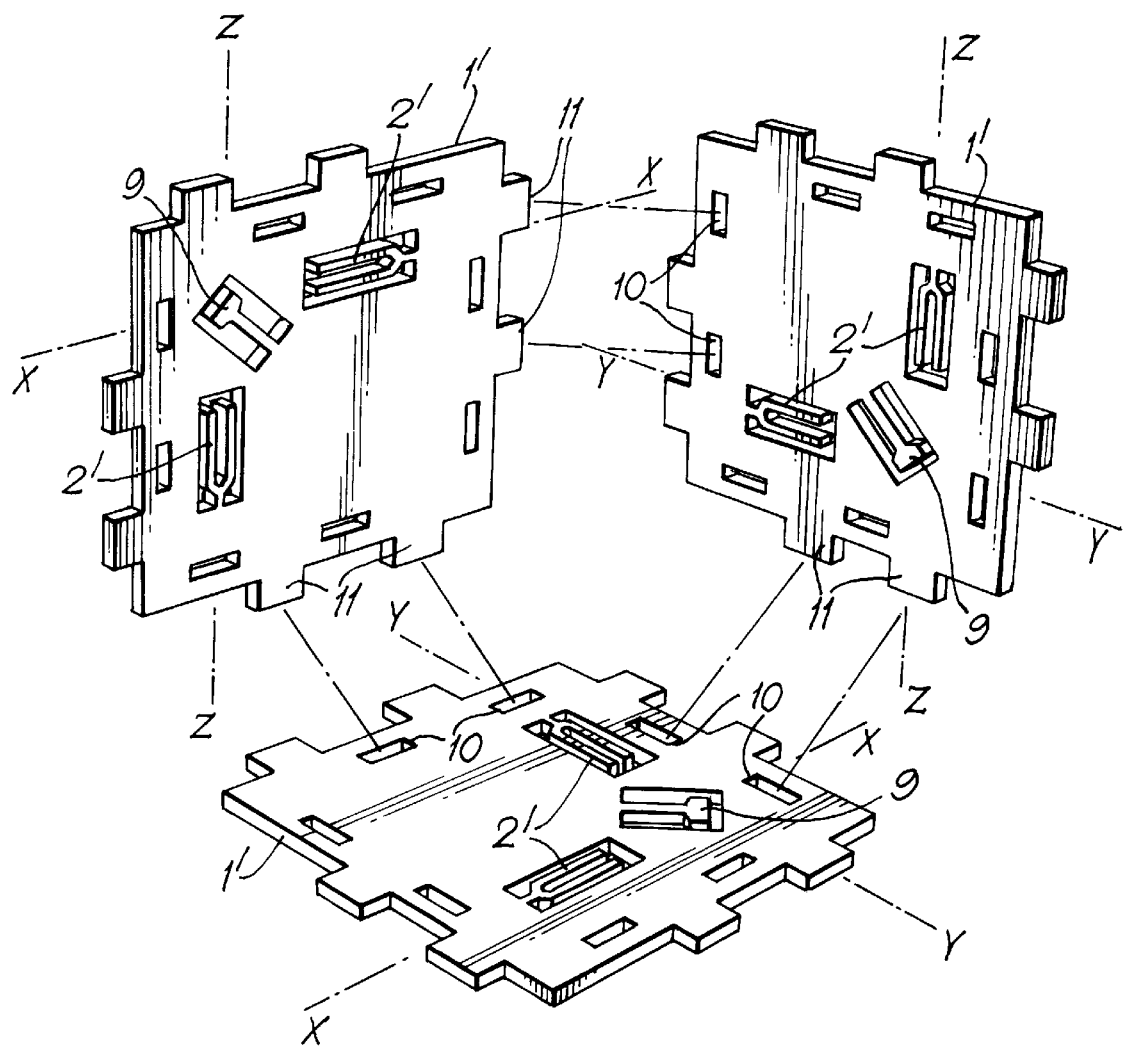
FIG. 4 shows a relation of power of an output signal from the background sensing circuit and a flow rate.

According to experiments conducted by the inventors of the present invention, in these embodiments of the present invention the measured value is stable on fast flow as compared with the background apparatus as shown in FIG. 2.

FIG. 16 shows a relation of power of output signal V from the sensing circuit and a flow rate Q using the embodiment of present invention as shown in FIG. 7, and FIG. 7 clearly shows the benefits of the present invention.

Although the above-mentioned embodiments are explained with a thin film sensor having a heater 7 and two sensing portions 9, 11 as examples, the type of sensor is not limited to this type if only the sensor includes a substrate. For example, the thin film sensor may include two electric resistors in a combined sensing portion and heater, or the thin film sensor may include one electric resistor in a combined sensing portion and heater. As the present invention is not dependent on the type of sensor, a detailed explanation of the sensor itself is omitted.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A flow sensor apparatus for measuring a physical property of a fluid flowing through a fluid path, comprising:

a wall forming at least a portion of the fluid path;

a substrate installed on said wall, said substrate having an upstream side edge and a downstream side edge;

a flow sensor constructed with at least one electric resistor formed on said substrate; and means for reducing turbulence caused by an existence of the flow sensor, wherein said means is a construction that said substrate is embedded into said wall.

2. A flow sensor apparatus for measuring a physical property of a fluid flowing through a fluid path, comprising:

a wall forming at least a portion of the fluid path;

a substrate installed on said wall;

a flow sensor constructed with at least one electric resistor formed on said substrate;

a support board set in the fluid path on which said flow sensor is mounted, said support board having an upstream side edge and a downstream side edge; and means for reducing turbulence caused by an existence of the flow sensor, wherein said means includes a construction of at least one of the upstream side edge and downstream side edge of said support board.

3. The flow sensor apparatus for measuring a physical property of a fluid flowing through a fluid path according to claim 2, wherein said means for reducing turbulence is a construction that at least the upstream side edge of said support board is formed into an acute angle.

4. The flow sensor apparatus for measuring a physical property of a fluid flowing through a fluid path according to claim 2, wherein said means for reducing turbulence is a construction that the upstream side edge and the downstream side edge of said support board are both formed into an acute angle.

5. The flow sensor apparatus for measuring a physical property of a fluid flowing through a fluid path according to claim 2, wherein said means for reducing turbulence is a construction that at least one of said upstream side edge and said downstream side edge of said support board is formed into a streamline.

6. The flow sensor apparatus for measuring a physical property of a fluid flowing through a fluid path according to claim 2, wherein said means for reducing turbulence is a construction that the upstream side edge and the downstream side edge of said support board are both each formed into a streamline.

* * * * *